No. 788,867. PATENTED MAY 2, 1905.
H. WEHNER.
AUTOMATIC CLOSING VALVE.
APPLICATION FILED NOV. 11, 1904.
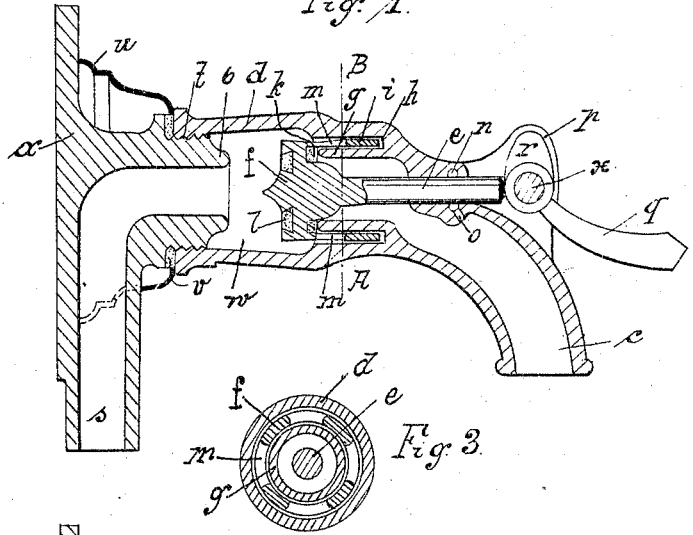
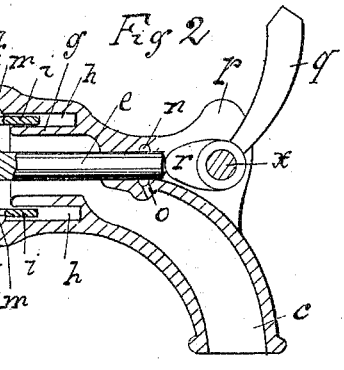
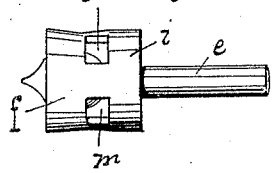

No. 788,867. Patented May 2, 1905.

UNITED STATES PATENT OFFICE.

HEINRICH WEHNER, OF FRANKFORT-ON-THE-MAIN, GERMANY.

AUTOMATIC-CLOSING VALVE.

SPECIFICATION forming part of Letters Patent No. 788,867, dated May 2, 1905.

Application filed November 11, 1904. Serial No. 232,362.

*To all whom it may concern:*

Be it known that I, HEINRICH WEHNER, a subject of the German Emperor, residing at 223 Röderbergweg, Frankfort-on-the-Main, Germany, have invented certain new and useful Improvements in Automatic-Closing Valves, of which the following is a specification.

A great many automatic-closing cocks and valves have been constructed in the last years for preventing fluids—for instance, the water in water systems—from being wasted and for reducing as much as possible the losses of the fluids, more particularly for positively closing the cocks or valves without any shocks after the desired quantities of the fluids have been drawn off. Among these known cocks and valves there are many ingenious constructions, of which a great many are, however, practically useless, more particularly for water systems. The best of such constructions are too expensive, and therefore have not come into general use. Very frequently even technical reasons, such as intricate construction and unsafe working, prohibit the employment of such known cocks and valves.

My invention relates to improvements in automatic-closing valves used for drawing or tapping fluids, whereby a waste of the fluid is prevented and the automatic closing of the valve is effected without any violent or sudden shock and in a certain and absolutely safe manner in spite of any foreign body taken along by the fluid—such as sand-corns, pieces of stone, &c.—also, the construction of the valve is rendered very simple and reliable, as all stuffing-boxes and packed pistons are avoided, so that the new valve can be manufactured cheaply.

I will now proceed to describe my invention with reference to the accompanying drawings, in which—

Figure 1 is a vertical longitudinal sectional view of an automatic-closing valve applied to a water-supply, the valve proper being closed. Fig. 2 is a similar sectional view of the same, the valve proper being opened. Fig. 3 is a cross-section through the same on the line A B in Fig. 1, and Fig. 4 is an elevation of the valve proper.

Similar letters of reference refer to similar parts throughout the several views.

$a$ denotes a disk cast in one piece with a bent-supply $s$ and arranged to be affixed on a wall in any known manner. The end face $b$ of the bent-supply $s$ is formed as the one seat of a double-seated valve $f$. The disk $a$ is screw-threaded at $t$ and may be provided with a facing-cap $u$, of sheet metal. The valve-casing $d$ is cast in one piece with the outlet $c$ and arranged to be secured on the disk $a$ by screwing on the threaded part $t$. A packing-disk $v$ may be inserted between a flange of the disk $a$ and the end face of the valve-casing $d$. The valve $f$ is cast in one piece with a cylindrical shank $e$ and an annular piston $i$, which latter is preferably made to slightly taper on the outside toward the valve proper, $f$, and is provided with several openings $m\ m$. (See Fig. 4.) The shank $e$ of the valve $f$ is mounted to longitudinally slide and turn in a guiding-hole of the casing $d$, and an annular groove $n$ is preferably provided in this guiding-hole and connected with the outlet $c$ by means of a channel $o$. An annular deep recess $h$ is turned into the valve-casing $d$ around the second seat $g$, and the annular piston $i$ on the valve $f$ is arranged to engage loosely in this recess $h$, a sufficient play being left to it. The piston $i$ forms, with the annular recess $h$, a water-brake for a purpose to be explained later on. The valve $f$ is provided on the face opposite the seat $b$ with an annular recess $l$ of dovetailed cross-section, and on the face within the annular piston $i$ and opposite the seat $g$ with a recess $k$. Both recesses $l$ and $k$ are filled up with packing-disks for tightening the valve $f$ in either extreme position on the seat $b$ or $g$, respectively. The valve-casing $d$ is externally provided with two lugs $p$, in which a cross-pin $x$ is secured. A cam $r$, cast in one piece with a handle $q$, is mounted to turn on the cross-pin $x$.

The automatic-closing valve is operated in the following manner: Normally the handle $q$ and the cam $r$ occupy the position shown at Fig. 1, so that the valve proper, $f$, is forced outward on its seat $g$ by the pressure of the water in the supply $s$, a little play being preferably left between the external end of the shank $e$ and the nave of the cam $r$ and handle $q$. On turning upward the handle $q$ the cam $r$ will act upon the end face of the shank $e$ and move the latter inward, thereby opening the valve $f$. Of course the piston $i$ partakes in this movement, so that a corresponding quantity of water is sucked from the valve-chamber $w$ and fills the space in the annular recess $h$. When the handle $q$ is completely turned upward into the position shown at Fig. 2, the top of the cam $r$ will bear against the end face of the shank $e$, so that the pressure of the water acting upon the left face of the valve $f$ will force the shank $e$ on the top of the cam $r$, and the friction thus produced will prevent the cam $r$ from moving, and the valve $f$ remains permanently open. The water passes from the supply $s$ around the valve $f$ through the openings $m\ m$ in the piston $i$ to the outlet $c$ and escapes. Any water that may pass through the guiding-hole around the shank $e$ will be collected in the annular groove $n$ and escape through the channel $o$, it being sucked by the stream of water in the outlet $c$ in a similar manner as in an injector. Thus no water is permitted to escape in the longitudinal direction of the shank $e$ to without in a spray. It will be noted that the valve $f$ at this moment occupies an intermediate position between its two seats $b$ and $g$, so as to allow the water to pass over or around it. Should from any cause—such as, for instance, a fracture of the main—the pressure of the water in the supply $s$ disappear, a partial vacuum would be produced by the water running off and cause the valve $f$ to close its seat $b$, so that the water will now be checked in its motion. For again closing the valve $f$ it is only necessary to turn the handle $q$ downward, and thereby to release the valve-shank $e$, when the pressure of the water acting upon the left face of the valve $f$ will move the latter outward and cause it to close its seat $g$. This motion of the valve $f$ is, however, retarded, since the annular piston $i$ is obliged to force the water out of the annular recess $h$, so that the valve is thereby braked and closes silently and without any heavy or violent blow. For tapping a considerable quantity of water the handle $q$ is completely turned upward and may be left in this position, since the cam $r$ is prevented by the friction from shifting, as explained above. For drawing a smaller quantity of water from the supply $s$ the handle $q$ is turned upward only a little or through a part of its stroke without the top of the cam $r$ coming into contact with the end face of the shank. Then the handle $q$ requires to be permanently held with the hand or otherwise until the desired quantity of water has been drawn, when the handle $q$ is again turned downward. As the weight of the handle $q$ is preferably made sufficiently heavy, the handle $q$ may even be released, as the weight of the handle $q$ will then automatically turn the latter downward, so that the valve $f$ under the action of the water will close its seat $g$.

From an examination of the drawings it will be evident that the turning and the screw-threading of both the disk $a$ and the valve-casing $d$ is very easy and simple and that the separately-turned valve $f$ can be at once introduced into the casing $d$, so that the latter need not be made in several parts. The boring of the holes in the lugs $p$ for the cross-pin $x$ is very simple, and the handle $q$, with the cam $r$, can be at once disposed on the pin $x$. There are no stuffing-boxes, so that the valve $f$ is perfectly at liberty to move without any friction.

The operation of the new valve is easy and safe, as the valve remains in its open state when once the handle $q$ has been completely turned upward, but not so when the handle is turned not quite upward, as in this case the valve will automatically close the moment the handle $q$ is released. For drawing off water in small quantities it will be necessary to turn the handle $q$ upward through a convenient part of its stroke and to hold it in this position. Any carelessness will then be of no consequence, since the valve will automatically close in any case on being left alone, and the water is thereby prevented from being wasted. The valve $f$ when once opened by completely turning upward the handle $q$ will remain in this condition as long as there is a pressure in the supply-pipe $s$. On this pressure disappearing from any cause (for example, a fracture of the main, shutting off the supply, or the like) the valve $f$ will automatically close its other seat $b$, as described above. This is of special importance, since all noxious fumes or offensive vapors, putrefactive odors, and germs of disease will be prevented from getting into the supply-pipe $s$. The present knowledge of the life and nature of the micro-organisms ought to make this a compulsory condition for all water systems intended for supplying drink-water.

The automatic-closing valve described so far may be varied without deviating from the spirit of my invention.

What I claim as my invention, and desire to secure by Letters Patent, is—

1. In an automatic-closing valve, the combination with a casing comprising a valve-chamber, a supply, an outlet, a valve-seat leading to the outlet, a valve-seat leading to the supply, an annular recess concentric with the valve-seat and communicating with the valve-chamber and a guiding-hole in the axis of the valve-seat, of a valve in the valve-chamber and having a shank and an annular piston, the shank being longitudinally movable in the guiding-hole and extending to without and the annular piston loosely engaging in the annular recess to form therewith a fluid-brake and being provided with a plurality of openings for the passage of the fluid to the outlet, and means for moving from without the shank of the valve to open the latter, the pressure of the fluid from the supply tending to close the valve on the latter being released from without.

2. In an automatic-closing valve, the combination with a casing comprising a valve-chamber with two coaxial valve-seats leading to the supply and the outlet respectively, an annular recess concentric with the outlet-valve seat and communicating with the valve-chamber and finally a guiding-hole in the axis of the two valve-seats, of a double-seated valve adapted to close the outlet-valve seat under the pressure of the fluid in the supply and to close the supply-valve seat on the fluid-pressure disappearing from any cause and provided with a shank and an annular piston, the shank being longitudinally movable in the guiding-hole and extending to without and the annular piston loosely engaging in the annular recess to form therewith a fluid-brake and being provided with a plurality of openings for the passage of the fluid from the supply over the double-seated valve to the outlet, and means for moving from without the shank of the valve to open the latter.

3. In an automatic-closing valve, the combination with a casing comprising a valve-chamber with two coaxial valve-seats leading to the supply and the outlet respectively, an annular recess concentric with the outlet-valve seat and communicating with the valve-chamber and a guiding-hole in the axis of the two valve-seats, the outlet being curved from the axis to a side, of a double-seated valve in the valve-chamber and having a shank and an annular piston, the shank being longitudinally movable in the guiding-hole and extending to without and the annular piston loosely engaging in the annular recess to form therewith a fluid-brake and being provided with a plurality of openings for the passage of the fluid from the supply over the double-seated valve to the outlet, a cross-pin secured in the casing in the axis of the valve-shank, and a handle turnable on the cross-pin and integral with a cam adapted to bear on the end of the valve-shank and thereby to open the double-seated valve by moving it into an intermediate position on the handle being turned in a direction, while on the handle moving or being moved in the opposite direction the cam releases the valve-shank and the double-seated valve silently closes the outlet-valve seat under the pressure of the fluid from the supply, the double-seated valve being adapted to be sucked by the fluid to close the supply-valve seat on the fluid-pressure disappearing from any cause.

4. In an automatic-closing valve, the combination with a disk comprising a supply and being screw-threaded and formed to a first valve-seat on the one supply end, of a casing adapted to be screwed on the screw-thread of the disk and to form therewith a valve-chamber and having a second valve-seat coaxial with the first one, a curved outlet leading from the second valve-seat to a side and a guiding-hole in the axis of the two valve-seats, a double-seated valve adapted to be introduced into the casing and to close the second valve-seat under the pressure of the fluid in the supply and to close the first valve-seat on the fluid-pressure disappearing from any cause and provided with a shank and an annular piston, the shank being longitudinally movable in the guiding-hole and extending to without and the annular piston loosely engaging in the annular recess to form therewith a fluid-brake and being provided with a plurality of openings for the passage of the fluid from the supply over the double-seated valve to the outlet, a cross-pin secured in the casing in the axis of the valve-shank, and a handle turnable on the cross-pin and integral with a cam adapted to bear on the end of the valve-shank for opening the double-seated valve by moving it into an intermediate position, so that on the handle being turned in a direction into an extreme position the cam checks the double-seated valve and on the handle being reversed, the double-seated valve will close the outlet, while on the handle being turned in the one direction to an intermediate position and then released the cam will be pushed back by the double-seated valve and reverse the handle.

5. The combination with a casing comprising a valve-chamber, a supply, an outlet, a supply-valve seat, an outlet-valve seat, of a valve in said chamber adapted to be forced against the said outlet-valve seat by the supply-pressure, and to be drawn against the supply-valve seat by supply-suction, and means for moving said valve from said outlet-valve seat, substantially as described.

In testimony whereof I have signed my name to this specification in the presence of two subscribing witnesses.

HEINRICH WEHNER.

Witnesses:
JEAN GRUND,
CARL GRUND.